(12) United States Patent
Peek

(10) Patent No.: US 9,514,397 B2
(45) Date of Patent: Dec. 6, 2016

(54) PRINTER MONITORING

(71) Applicant: Intel Corporation, Santa Clara, CA (US)

(72) Inventor: Gregory A. Peek, Northplains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/665,679

(22) Filed: Mar. 23, 2015

(65) Prior Publication Data

US 2016/0283833 A1 Sep. 29, 2016

(51) Int. Cl.
 *G06F 15/00* (2006.01)
 *G06K 15/00* (2006.01)
 *G06K 15/02* (2006.01)

(52) U.S. Cl.
 CPC .......... *G06K 15/408* (2013.01); *G06K 15/021* (2013.01)

(58) Field of Classification Search
 CPC combination set(s) only.
 See application file for complete search history.

(56) References Cited

U.S. PATENT DOCUMENTS

| 2005/0103843 | A1* | 5/2005 | Davie | G06K 1/12 235/440 |
| 2012/0062956 | A1* | 3/2012 | Kitagawa | G03G 15/6585 358/2.1 |
| 2014/0307063 | A1* | 10/2014 | Lee | G06T 7/2046 348/51 |
| 2015/0301517 | A1* | 10/2015 | Chen | G05B 19/4099 700/118 |

* cited by examiner

*Primary Examiner* — Helen Q Zong
(74) *Attorney, Agent, or Firm* — International IP Law Group, P.L.L.C.

(57) ABSTRACT

Techniques for monitoring a three-dimensional (3D) printer during the performance of a print job are described herein. An example of a system in accordance with the present techniques includes a camera to generate an image of a 3D print job in progress. The system also includes a baseline image generator to generate a baseline image based on a 3D model of the object to be printed. The system also includes a monitoring engine to compare the image with the baseline image to determine a status of the 3D print job and trigger an alarm if the 3D print job fails.

21 Claims, 3 Drawing Sheets

PRINTER MONITORING

TECHNICAL FIELD

The present disclosure relates generally to techniques for electronically monitoring a printing system. More specifically, the present disclosure describes techniques for monitoring a three-dimensional (3D) printer during a print job.

BACKGROUND ART 3D printing of an object can take a long time to complete. Several hours is not uncommon, depending on the size and complexity of the object. Several failure modes can and frequently do occur, including de-adhesion to the build platform, non-optimal printer parameters resulting in a malformed object, and running out of plastic, to name a few. Many hours of printing time can be wasted if the print error is not discovered in a timely manner, which may result in delays in completing a project.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure describes techniques for monitoring a 3D print job using an automated monitoring system. Embodiments of the present techniques also relate to computer vision. As explained above, many hours of printing time and materials can be wasted if the print error is not discovered in a timely manner. One solution to this problem may be to have an operator watch the print job. However, constantly watching 3D print jobs is expensive and impractical as a person may need to be paid to do nothing more than watch the print job, especially those that run overnight.

Described herein is a monitoring system that can monitor a 3D print job to detect failures. The system can include one or more cameras, arranged at strategic locations around the building platform of the 3D printer. Images captured by the cameras can be processed and compared against a baseline image to determine whether the 3D print job is progressing as expected. The baseline image may be computed based on the coded printer instructions that are used to control the 3D printer. The printer instructions may be used to generate a 3D model, and the 3D model can be used to generate any number of two-dimensional (2D) images that can be compared against the camera images. If the image comparison indicates a problem, the system can stop the print job and alert the operator.

With this system, an operator could confidently do other tasks, even leave the premises, knowing that if there is a problem, they can be alerted to return to correct the problem. The operator can also alerted when the print job finishes successfully, so they can return to start another print job or be confident the object will be ready when they are able to return, perhaps the next morning.

Figure 1:
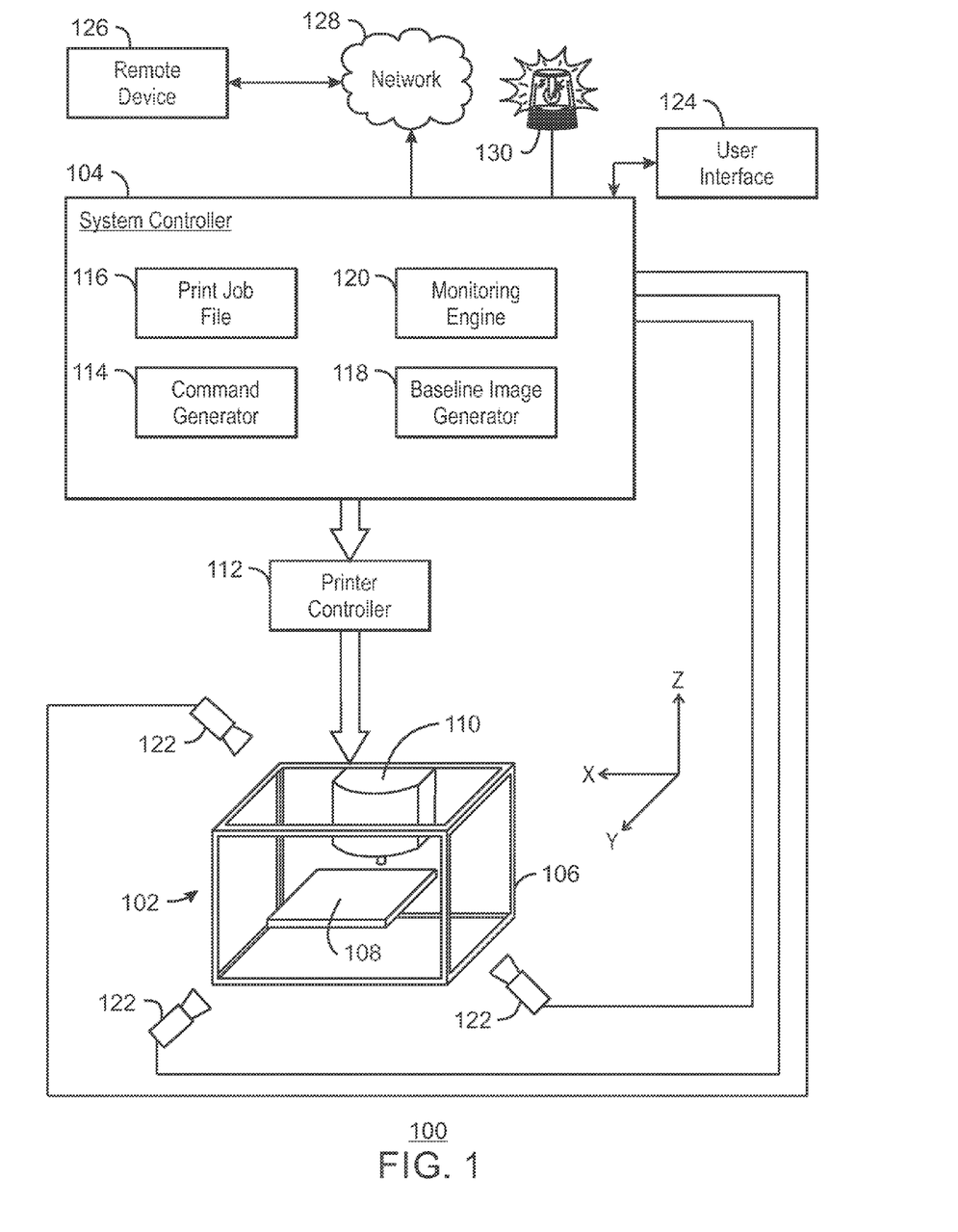
FIG. 1 is a block diagram of a system for monitoring a 3D printer during the performance of a print job.

FIG. 1 is a block diagram of a system for monitoring a 3D printer during the performance of a print job. The system 100 includes a 3D printer 102, which is configured to fabricate a three-dimensional object from a 3D model. The system 100 also includes a system controller 104, which sends print commands to the 3D printer 102 and monitors progress of the print job. The 3D printer 102 may be any suitable type of 3D printer, such as a Fused Deposition Modeling (FDM) printer, Fused Filament Fabrication (FFF) printer, Stereolithography printer, and others. By way of example, the 3D printer described herein is an FDM or FFF printer. However, it will be appreciated that the monitoring techniques described herein can be applied to other types of 3D printers.

The 3D printer 102 can include a frame 106, a build platform 108, and an extruder 110. The build platform 108 is the surface on which the object is to be fabricated. The extruder 110 deposits the material that forms the object. The 3D printer 102 also includes various robotic elements (not shown) for controlling the relative positioning of the extruder 110 and the build platform 108 so that material is deposited at the correct position during the print job. The robotic elements may be configured to move the building platform, the extruder 110, or both. For example, in some 3D printers, the build platform 108 remains stationary, while the extruder 110 moves in the X, Y, and Z directions. In some 3D printers, the extruder 110 may be configured to move in the X and Y directions while the build platform 108 moves in the Z direction (up and down). Various other configurations are also possible.

The extruder 110 may be configured to deposit any suitable type of material, including thermoplastics, photopolymers, metal alloys, ceramic materials, metal powders, and ceramic powders, among others. Additionally, more than one material may be deposited, each material having different properties, such as a different color for example. The monitoring system 100 can be used with substantially any type of 3D printer.

The extruder 110 and build platform 108 are controlled by a printer controller 112, which generates control signals that are sent to the appropriate components, e.g., motors, heaters, pumps, and the like. The control signals are generated based on printer commands received from the system controller 104. The printer commands instruct the printer where to position the extruder 110 and the path that the extruder 110 is to follow. The instructions also indicate when to deposit material, when to stop depositing material, what material to deposit, and the like.

In some examples, the system controller 104 includes a command generator 114, a print job file 116, a baseline image generator 118, and a monitoring engine 120. The command generator 114 can generate printer commands by reading the commands from the print job file 116. The printer commands may be formatted as G-code or any other suitable format. In the case of stereolythography, each print command may be a two dimensional image that represents a full layer of the 3D object to be printed. The print job file may be generated from a 3D model, which may be any suitable file format for representing three-dimensional objects, including Standard Tessellation Language (STL) among others. The 3D model may be generated using a 3D modeling program such as a 3D Computer Aided Design (CAD) program. In some examples, the 3D modeling program may reside on the same device as the system controller 104. The 3D model and print job file 116 may be stored to any suitable type of electronic data storage device, which is a physical memory such as a hard drive, an optical drive, a flash drive, a memory card, and the like. The command generator 114 sends the generated printer commands to the printer controller 112 for execution of the commands. The command generator 114 also sends the printer commands to a baseline image generator 118 for monitoring purposes as further discussed below.

The system also includes one or more cameras 122, which may be communicatively coupled to a monitoring engine 120. Each camera may be configured to obtain still images or frames of video. Although three cameras 122 are shown, the system can include any suitable number of cameras, including 1, 2, 3, 4, or more. Each camera captures images and transmits the images to the monitoring engine 120. The monitoring engine 120 receives the images from the cameras 122, pre-processes the images if appropriate, and compares each image to a corresponding baseline image that represents the image to be expected if the print job is proceeding normally. As described further in relation to FIG. 2, pre-processing the images can include correcting for lighting differences, and performing edge detection, among others. In some examples, one or more lights may be added in or around the 3D printer to improve the lighting quality of the captured images.

In the example shown in FIG. 1, the baseline image generator 118 generates the baseline image based on the print commands used to drive the 3D printer. The printer commands describe the exact motions that the 3D printer 102 will make to create the object. Therefore, the printer command description can be used to recreate the three-dimensional object at any stage of the printing process. Generation of the baseline images includes generation of a baseline 3D model from the executed printer commands and processing of the baseline 3D model to generate one or more two-dimension baseline images, each of the two-dimensional baseline images corresponding to one of the camera perspectives. The processing of the baseline 3D model may include performing various transformations, such as position transformations and rotational transformations, masking elements of the 3D printer, masking background features, and other mathematical operations. The generation of the baseline images is described further in relation to FIG. 2.

After a particular printer command has been executed by the printer controller 112, the resulting images collected by the cameras 122 can be compared to the corresponding baseline images generated by the baseline image generator 120. The baseline image generation and image comparison may be performed after each execution of a printer command, or at a regular intervals such as after a specified number of commands, after an entire layer of the 3D object has been created, at a specified time interval, and so on.

During execution of the print job, the operator of the 3D printer 102 can initiate a monitoring routine for the print job. In some examples, the operator may be able to specify one or more optional parameters of the monitoring routine through a user interface 124 coupled to the monitoring engine 120. The user interface 124 may be a control panel of the 3D printer 102 or a separate computing device, such as a desktop computer, laptop computer, tablet computer, and the like. The monitoring engine 120 can also be coupled to a remote device 126 through a network 128, such as an Ethernet Local Area Network (LAN), the Internet, a phone network, and so on. The remote device 126 can be any electronic device, including a cell phone, smart phone, tablet computer, laptop computer, and the like.

During the monitoring of the print job, the image comparison is used to determine the status of the print job, such as whether the print job is proceeding as expected, is finished, has failed for some reason. Many of the failure modes will result in a deformation of the 3D object being printed. Thus, differences between the expected baseline image and the actual image received by one of the camera can indicate a failure. Upon detecting a failure, the monitoring engine 120 may take one or more of several possible actions to alert the operator, including activating an alarm 130, sending a message to the user interface 124, and sending a message to the remote device 126. Failure detection is described further below in relation to blocks 220 and 222 of FIG. 2.

The monitoring engine 120 may also stop the print job upon detecting a failure of the print job. In some examples, a message may be sent to the remote device 126, and the operator may be given the option to stop the print job remotely. The operator may also be able to access the images generated by the cameras 122. For example, the monitoring engine 120 may send the images to the remote device 126 along with the message, or in response to a user request for the images. In this way, the operator may be able to confirm that the print job has failed or determine that the failure message was a false alarm. The monitoring engine 120 can be communicatively coupled to the command generator 114 so that in the event of a failure, the monitoring engine 120 can instruct the command generator 114 to stop the print job.

In some examples, the monitoring engine 120 may be configured to implement a calibration routine, which calibrates the system for the position and orientation of each camera 122. In the calibration routine, a test object is printed and camera images are captured for each camera 122. One or more calibration factors may be determined for each camera 122 by determining the degree of baseline image adjustment needed to match the baseline image to the captured images of the printed object. Calibration factors may be computed for camera position adjustments, camera angle adjustments, image brightness adjustments, and others. The calibration factors may then be used for the monitoring of subsequent print jobs.

The printer controller 112, command generator 114, monitoring engine 120, and baseline image generator 118 may be implemented in hardware or a combination of hardware and software. For example, some or all of these components may include programming instructions stored to a computer-readable medium and configured to be executed by a processor. Some or all of these components may also be implemented in any combination of Application Specific Integrated Circuit (ASICs), Field Programmable Gate Array (FPGAs), logic circuits, and the like.

In some examples, the monitoring system 100 is built into the 3D printer 102. For example, the cameras 122 may be built into the frame 106, and various components such as the monitoring engine 120 and the baseline image generator 118 may be implemented as part of the processing resources included in the 3D printer 102. The command generator 114 can also be a component of the 3D printer 102, and the 3D print job file 116 may be received from a coupled computing device or stored, for example, in a removable memory device of the 3D printer 102.

In other examples, the monitoring system 100 may be a separate system that is configured to interact with the 3D printer 102. For example, the command generator 114, baseline image generator 118, and monitoring engine 120 can be implemented in a separate device, such as general-purpose computer or workstation, and the command generator 114 can send print commands to the printer controller 112 through a cable connection. Various other arrangements are possible, and the present techniques are not limited to one particular arrangement.

It is to be understood that the block diagram of FIG. 1 is not intended to indicate that the system 100 is to include all of the components shown in FIG. 1. Further, the system 100 may include any number of additional components not shown in FIG. 1, depending on the details of the specific implementation.

Figure 2:
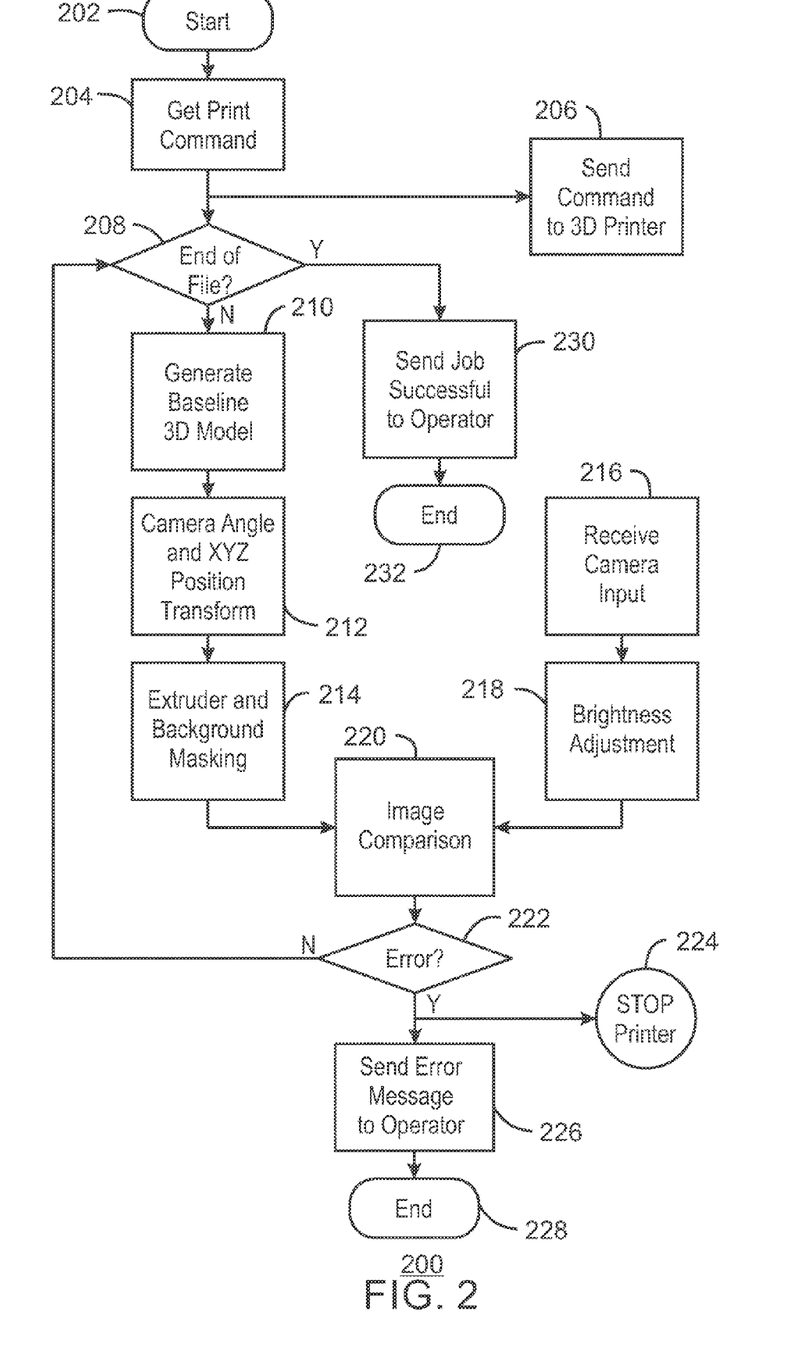
FIG. 2 is a process flow diagram of a method of monitoring a 3D printer during the performance of a print job.

FIG. 2 is a process flow diagram of a method of monitoring a 3D printer during the performance of a print job. The method 200 described herein may be implemented, for example, by the system 100 of FIG. 1 and may begin at block 202.

At block 202, a print job is initiated. The print job is executed in a series of print commands sent to the printer controller. Once initiated, the printer controller begins receiving print commands and the monitoring engine begins receiving images of the building platform from the cameras. In some examples, the cameras will have been calibrated prior to initiating the print job.

At block 204, a print command is obtained. Each print command may be obtained by reading the print commands in order from a file, such as a G-code file.

At block 206, the print command is sent to the printer controller, which causes the 3D printer to perform the action indicated in the print command.

At block 208, a determination is made regarding whether the end of the print job file has been reached. If the end of the print job file has not been reached, the process flow advances to block 210.

At block 210, a baseline 3D model is generated. The baseline 3D model is generated based on each of the print commands that have been received since the start of the print job. Accordingly, the current print command can be added to the list of 3D print commands received up to that point. The resulting list of print commands is processed to generate the 3D baseline model. Also at block 210, some information about the state of the baseline model is stored to memory so that the next print command can be added to the baseline model. For example, all of the print commands can be stored as they are received so they can be replayed to generate the 3D model at the current point of the printing job. In another example, the generated 3D model is stored at each iteration of the method 200. When a new print command is received, the print command is processed to add corresponding features to the existing baseline model stored during the previous iteration.

At block 212, two-dimensional baseline images are generated based on the 3D model. Each of the baseline images is generated to correspond with the perspective of one of the cameras collecting images of the build platform. Accordingly, the 3D baseline model is rotationally transformed and scaled so that the resulting two-dimensional baseline image matches the viewing angle, distance, and focal length of the corresponding camera.

The 3D baseline model may also undergo a positional transformation for each camera, based on the position of the build platform relative to the corresponding camera. In some implementations, the build platform remains stationary, and the positional transformation may be performed based on a static set of position parameters that characterize the relative position of the build platform and the camera.

In some implementations, depending on the type of 3D printer, the build platform may move during the printing process to properly position the 3D object relative to the extruder. For example, the build platform may move downward after each successive layer of the 3D model is deposited. In some cases, the build platform may also move laterally and/or back-and-forth to position the 3D object in the X and/or Y coordinates. Accordingly, in some cases, the location of the printed object may move within the field of view of the camera. Thus, depending on the type of 3D printer, the positional transformation of the 3D baseline model is performed according to the movements of the build platform, as indicated by the print commands included in the print job file.

At block 214, image masking is performed for the two-dimensional baseline images. Masking refers to manipulations of the baseline image that acts to remove those portions of the baseline image from the image comparison. Portions of the baseline image that are not used in the image comparison are referred to as masked. A portion of a baseline image can be masked by eliminating the masked portion from the baseline image and/or somehow flagging the masked portion, such as by setting masked portions of the image to a specified value or color.

In some implementations, the extruder may block a clear view of the 3D object by one or more of the cameras. Other parts of the 3D printer, such as the frame, may also block a clear view of the 3D object being printed. Additionally, each camera may also pick up background features. Image masking can be used to prevent an alarm being triggered due to the extruder, the background features, or other features that are not part of the object being printed. Masking prevents portions of the image received by the camera, such as the extruder, printer frame, and background features, from being included in the image comparison. One step in the masking process may be to mask any background-related portions of the baseline image that do not correspond with the 3D object being printed.

The masking may also be performed based, in part, on the position of the extruder relative to the camera. The position of the extruder can be determined based on the print commands. The position of the extruder can be modeled and used to determine the expected 2D projection the extruder will have for a particular camera view. To the extent that the extruder would be expected to block a clear view of the 3D object being printed, those portions of the baseline image can be masked. In some examples, there may be static foreground elements that are masked without being modeled by movement of the printer. For example, a portion of the frame of the 3D printer could be between the camera and the 3D object being printed, and the mask would remain the same for the entire print job. The generation of the baseline images may be performed in parallel with capturing and processing the images collected by the cameras, which is described in relation to blocks 216 and 218.

At block 216, camera input is received from each of the cameras. The camera input received at block 216 is a single image of the 3D platform and the 3D object being printed. The camera input may be a frame of video input or a single still image. The frequency of the image collection may be specified by the user. For example, camera input may be received once per second, multiple times per second, once over few seconds, or any other suitable time frame. In the case of a camera collecting video data, the frequency of image collection can determine what percentage of frames are stored and used in the image comparison.

At block 218, the image brightness of the collected image may be adjusted. Adjusting the image brightness can eliminate or reduce the effect of shadows and other lighting artifacts in the image. Adjusting the image brightness can also improve the color contrast between different features of the 3D object.

At block 220, each of the images collected from the cameras is compared with each of the corresponding baseline images. Various techniques can be used to perform the image comparison, and the image comparisons may be performed for each camera input. In one example, an edge detection algorithm can be applied to the camera image and the generated edges can be compared to the edges present in the baseline image. Edge detection can be used to identify the silhouette of the 3D object in the camera image as well as internal features, i.e., features interior to the 3D object's silhouette. The detected features can be compared with the baseline image and a degree of conformity can be calculated. The degree of conformity characterizes the level of agreement between the image captured by the camera and the baseline image. For example, the degree of conformity may be expressed as a percentage, wherein 100 percent indicates a perfect match between baseline image and the camera image.

The degree of conformity can be computed in a variety of ways. For example, the degree of conformity may be computed by comparing the area of the baseline image's silhouette with the area of the captured image's silhouette. In some examples, corresponding lines of the baseline image and the captured image may be identified, and the degree of conformity can then be computed based on the amount of deviation of these lines. For example, the degree of conformity may be computed as the area between the lines compared to the overall area of the captured image or baseline image. Additional techniques are also possible, such as computing a Peak Signal to Noise Ratio (PSNR) and/or Mean Squared Error (MSE) using the baseline image and captured image.

Furthermore, additional algorithms that do not rely on edge detection can also be used to compare the baseline images and captured images. For examples, the baseline image and captured images can both be converted to normalized greyscale images and the Peak Signal to Noise Ratio (PSNR) and/or Mean Squared Error (MSE) can be computed from these images. Additional algorithms for computing a degree of similarity between two images include Structural similarity (SSIM), Scale-Invariant Feature Transform (SIFT), Speeded Up Robust Features (SURF), among others.

At block 222, a determination is made regarding whether a printer error has been detected. The printer error detection is based on the comparisons performed at block 220. In some examples, the detection of an error may be triggered if the degree of conformity between the baseline image and the camera image is below a specified threshold for any one of the camera views. However, before triggering an error other factors may also be considered. For example, to guard against false alarms, the system may be configured such that any lack of conformity between the baseline image and the camera image is sustained for a specified period of time or a specified number of iterations of the process before triggering an error. Additionally, in an example in which multiple cameras are used, the system may be configured such that an error will not be triggered unless the image comparisons for two or more cameras indicate a print error.

If the image comparisons indicate that a print error has not occurred, the process flow may return to block 204, and the next print commend is obtained. The process may then be re-iterated using the new print command and new camera images. If, at block 222, the image comparisons indicate that a print error has occurred, the process flow may advance to blocks 224 and 226.

At block 224, the print job is stopped. The print job can be stopped by inserting a stop command in the list of printer commands sent to the printer controller. In some examples, the print job is stopped automatically based upon the detection of an error. In some examples, the system may wait for confirmation from an operator before stopping the print job.

At block 226, an error message is sent to the operator. The error message may be sent by any suitable means. For example, with reference to FIG. 1, the error message may be a message displayed on the user interface 124, the activation of an alarm, an electronic message sent to the remote device 126 over the network 128, or any combination thereof. In the case of an error message sent to a remote device, the error message may include information about the error, such as the camera images or a link to the camera images. The operator may also be given the option to confirm that the print job should be stopped or override the error and allow the print job to continue. If the print job is stopped, the process flow ends at block 228.

Returning to block 208, if the most recent print command received from the print job file is the last print command in the file, the process flow advances to block 230. At block 230, a message can be sent to the operator indicating that the print job has finished successfully. This can alert the operator to return to the 3D printer to collect the finished product from the 3D printer and possibly start another print job, which can reduce the amount of time that the 3D printer sits idle between print jobs. The process flow then ends at block 232.

It will be appreciated that any number of additional actions may be included within the method 200, depending on the specific application. Furthermore, the blocks of the method 200 may be performed in any suitable order, and are not limited to the specific ordering shown in FIG. 2.

Figure 3:
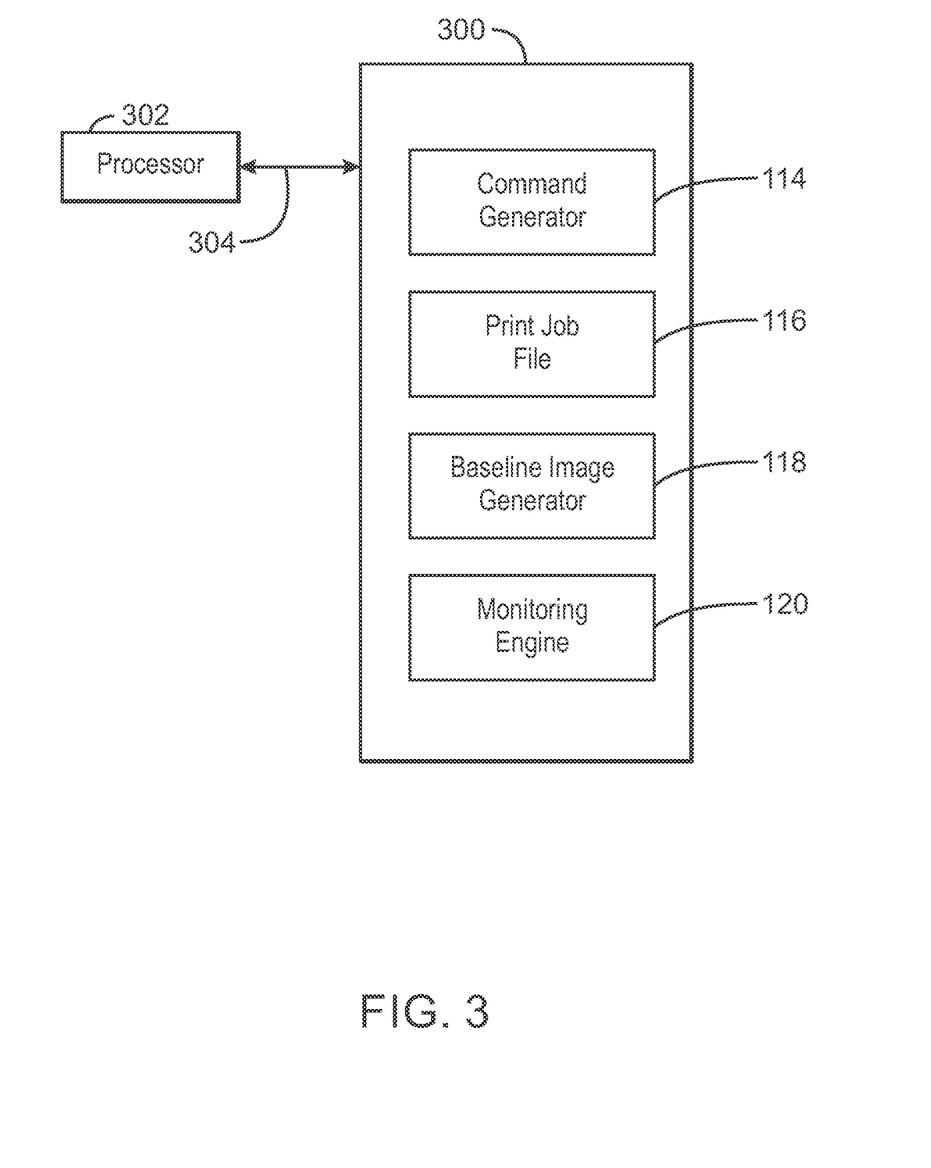
FIG. 3 is a block diagram showing a tangible, non-transitory machine readable medium that stores code for monitoring a 3D printer during the performance of a print job.

FIG. 3 is a block diagram showing a tangible, non-transitory computer-readable medium that stores code for monitoring a 3D printer during the performance of a print job. The computer-readable medium 300 may be included in a 3D printer or in a separate computing device that can be coupled to a 3D printer, such as, a laptop computer, desktop computer, or tablet computer, among others. The computer-readable medium 300 may also be a storage device, including a physical memory such as a hard drive, an optical drive, a flash drive, an array of drives, or the like.

The computer-readable medium 300 may be accessed by a processor 302 over a computer bus 304. Furthermore, computer-readable medium 300 includes code configured to direct the processor 302 to perform the methods described herein. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The various software components discussed herein may be stored on the computer-readable medium 300. For example, a command generator 114 can generate print commands that are used to control the 3D printer. In some examples, the print commands are generated by reading a print job file 116. Print commands can also be sent to the baseline image generator 118, which generates one or more baseline images from the print commands. A monitoring engine 120 receives one or more images of the object being printed by a 3D printer and compares the images with the baseline images to determine a status of the 3D print job. The monitoring engine 120 can also generate an error if the 3D print job has failed.

It is to be understood that the block diagram of FIG. 3 is not intended to indicate that the computer-readable medium 300 is to include all of the components shown in FIG. 3. Further, any number of additional components not shown in FIG. 3 may be included within the computer-readable medium 300, depending on the details of the specific implementation.

Examples may include subject matter such as a method, means for performing acts of the method, at least one machine-readable medium including instructions that, when performed by a machine cause the machine to performs acts of the method, or of an apparatus or system for printing a three-dimensional object and/or monitoring the printing of a three-dimensional object according to embodiments and examples described herein.

Example 1 is a system for monitoring a three-dimensional (3D) printer. Example 1 includes a baseline image generator to generate a baseline image based on a 3D model of the object to be printed. Example 1 also includes a monitoring engine to receive, from a camera, an image of a 3D print job in progress and compare the image with the baseline image to determine a status of the 3D print job and trigger an alarm if the 3D print job fails.

Example 2 includes the system of example 1. In example 2, the baseline image generator generates the model from print commands used to drive the 3D printer. Optionally, the print commands are in G-code format.

Example 3 includes the system of any combination of examples 1-2. In example 3, to generate the baseline image, the baseline image generator is to transform the 3D model to match the perspective of the camera.

Example 4 includes the system of any combination of examples 1-3. In example 4, to generate the baseline image, the baseline image generator is to perform a rotational transformation of the 3D model based on a position of the camera relative a build platform of the 3D printer.

Example 5 includes the system of any combination of examples 1-3. In example 5, to generate the baseline image, the baseline image generator is to perform a position transformation of the 3D model based on a position of a build platform of the 3D printer. Optionally, the position of the build platform is determined from print commands used to drive the 3D printer.

Example 6 includes the system of any combination of examples 1-5. In example 6, the baseline image generator is to mask a printer element from the baseline image. Optionally, to mask the printer element from the baseline image, the baseline image generator is to: determine a position of the printer element from print commands used to drive the 3D printer; determine, based on the position, that the printer element would partially block the view of the 3D object being printed; and mask the portion of the baseline image corresponding to the printer element.

Example 7 includes the system of any combination of examples 1-6. In example 7, the monitoring engine is to generate a completion message if the print job finishes successfully.

Example 8 is method of monitoring a three-dimensional (3D) printer during the performance of a print job. The method includes receiving an image of an object being printed by the 3D printer, and generating a baseline image based on a model of the object. The method also includes comparing the image with the baseline image to determine a status of the 3D print job, and generating an error if the 3D print job is failing.

Example 9 includes the method of example 1. In example 9, generating the model includes generating the model from print commands used to drive the 3D printer. Optionally, the print commands are in G-code format.

Example 10 includes the method of any combination of examples 8-9. In example 10, generating the baseline image includes transforming the 3D model to match a perspective of a camera used for capturing the image of the object.

Example 11 includes the method of any combination of examples 8-10. In example 11, generating the baseline image includes performing a rotational transformation of the 3D model based on a position of the camera relative a build platform of the 3D printer.

Example 12 includes the method of any combination of examples 8-10. In example 12, generating the baseline image includes performing a position transformation of the 3D model based on a position of a build platform of the 3D printer. Example 12 can optionally include determining the position of the build platform from print commands used to drive the 3D printer Example 13 includes the method of any combination of examples 8-12. In example 13, generating the baseline image includes masking a printer element from the baseline image. Optionally, masking the printer element from the image can include: determining a position of the printer element from print commands used to drive the 3D printer; determining, based on the position, that the printer element would partially block the view of the 3D object being printed; and masking the portion of the baseline image corresponding to the printer element Example 14 includes the method of any combination of examples 8-13. In example 14, the method also includes generating a completion message if the print job finishes successfully.

Example 15 is a non-transitory, tangible, computer-readable medium having instructions stored thereon that, when executed by a processor, direct the actions of a processor. The instructions direct the processor to receive, during the performance of a print job, an image of an object being printed by a 3D printer, and generate a baseline image based on a model of the object. The instructions also direct the processor to compare the image with the baseline image to determine a status of the 3D print job, and generate an error if the 3D print job has failed.

Example 16 includes the computer-readable medium of example 15. In example 16, the instructions direct the processor to generate the model from print commands used to drive the 3D printer. Optionally, the print commands are in G-code format.

Example 17 includes the computer-readable medium of any combination of examples 15-16. In example 17, the instructions direct the processor to transform the 3D model to match the perspective of the camera.

Example 18 includes the computer-readable medium of any combination of examples 15-17. In example 18, the instructions direct the processor to perform a rotational transformation of the 3D model based on a position of the camera relative a build platform of the 3D printer.

Example 19 includes the computer-readable medium of any combination of examples 15-17. In example 19, the instructions direct the processor to perform a position transformation of the 3D model based on a position of a build platform of the 3D printer. Optionally, the instructions direct the processor to determine the position of the build platform from print commands used to drive the 3D printer.

Example 20 includes the computer-readable medium of any combination of examples 15-19. In example 20, the instructions direct the processor to mask a printer element from the baseline image. Optionally, to mask the printer element from the baseline image, the instructions direct the processor to: determine a position of the printer element from print commands used to drive the 3D printer; determine, based on the position, that the printer element would partially block the view of the 3D object being printed; and mask the portion of the baseline image corresponding to the printer element Example 21 includes the computer-readable medium of any combination of examples 15-20. In example 21, the instructions direct the processor to generate a completion message if the print job finishes successfully.

Example 22 is a three-dimensional (3D) printer. The 3D printer includes a camera to generate an image of a 3D print job in progress. The 3D printer also includes logic to generate a baseline image based on a 3D model of the object to be printed and logic to compare the image with the baseline image to determine a status of the 3D print job and trigger an alarm if the 3D print job fails.

Example 23 includes the 3D printer of example 22. In example 23, the 3D printer includes logic to generate the model from print commands used to drive the 3D printer. Optionally, the print commands are in G-code format.

Example 24 includes the 3D printer of any combination of examples 22-23. In example 24, the 3D printer includes logic to transform the 3D model to match the perspective of the camera.

Example 25 includes the 3D printer of any combination of examples 22-24. In example 25, the 3D printer includes logic to perform a rotational transformation of the 3D model based on a position of the camera relative to a build platform of the 3D printer.

Example 26 includes the 3D printer of any combination of examples 22-24. In example 26, the 3D printer includes logic to perform a position transformation of the 3D model based on a position of a build platform of the 3D printer. Optionally, the position of the build platform is determined from print commands used to drive the 3D printer.

Example 27 includes the 3D printer of any combination of examples 22-26. In example 27, the 3D printer includes logic to mask a printer element from the baseline image. Optionally, the logic to mask the printer element from the baseline image is to: determine a position of the printer element from print commands used to drive the 3D printer; determine, based on the position, that the printer element would partially block the view of the 3D object being printed; and mask the portion of the baseline image corresponding to the printer element.

Example 28 includes the 3D printer of any combination of examples 22-27. In example 28, the 3D printer includes logic to generate a completion message if the print job finishes successfully.

Example 29 is a system for monitoring a three-dimensional (3D) printer during the performance of a print job. The system includes means for capturing an image of an object being printed by the 3D printer and means for generating a baseline image based on a model of the object. The system also includes means for comparing the image with the baseline image to determine a status of the 3D print job and means for generating an error if the 3D print job is failing.

Example 30 includes the system of example 29. In example 30, the system includes means for generating the model includes means for generating the model from print commands used to drive the 3D printer. Optionally, the print commands are in G-code format.

Example 31 includes the system of any combination of examples 29-30. In example 31, the means for generating the baseline image includes means for transforming the 3D model to match a perspective of a camera used for capturing the image of the object.

Example 32 includes the system of any combination of examples 29-31. In example 32, the means for generating the baseline image includes means for performing a rotational transformation of the 3D model based on a position of the camera relative a build platform of the 3D printer.

Example 33 includes the system of any combination of examples 29-31. In example 33, the means for generating the baseline image includes means for performing a position transformation of the 3D model based on a position of a build platform of the 3D printer. Optionally, the means for performing a position transformation of the 3D model includes means for determining the position of the build platform from print commands used to drive the 3D printer.

Example 34 includes the system of any combination of examples 29-33. In example 34, the means for generating the baseline image includes means for masking a printer element from the baseline image. Optionally, the means for masking the printer element from the baseline image includes: means for determining a position of the printer element from print commands used to drive the 3D printer; means for determining, based on the position, that the printer element would partially block the view of the 3D object being printed; and means for masking the portion of the baseline image corresponding to the printer element.

Example 35 includes the system of any combination of examples 29-34. In example 35, the system includes means for generating a completion message if the print job finishes successfully.

In the above description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, described herein. The various appearances "an embodiment," "one embodiment," or "some embodiments" are not necessarily all referring to the same embodiments.

Not all components, features, structures, or characteristics described and illustrated herein are to be included in a particular embodiment or embodiments in every case. If the specification states a component, feature, structure, or characteristic "may", "might", "can" or "could" be included, for example, that particular component, feature, structure, or characteristic may not be included in every case. If the specification or claims refer to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein may not be arranged in the particular way illustrated and described herein. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the machine readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A system for monitoring a three-dimensional (3D) printer, comprising:
   a baseline image generator to:
      generate a baseline image based on a 3D model of an object to be printed;
      determine a position of a printer element from print commands used to drive the 3D printer;
      determine, based on the position, that the printer element would partially block a view of the 3D object being printed; and
      mask a portion of the baseline image corresponding to the printer element; and
   a monitoring engine to receive, from a camera, an image of a 3D print job in progress and compare the image with the baseline image to determine a status of the 3D print job and trigger an alarm if the 3D print job fails.

2. The system of claim 1, wherein the baseline image generator generates the model from print commands used to drive the 3D printer.

3. The system of claim 2, wherein the print commands are in G-code format.

4. The system of claim 1, wherein to generate the baseline image, the baseline image generator is to transform the 3D model to match the perspective of the camera.

5. The system of claim 1, wherein to generate the baseline image, the baseline image generator is to perform a rotational transformation of the 3D model based on a position of the camera relative to a build platform of the 3D printer.

6. The system of claim 1, wherein to generate the baseline image, the baseline image generator is to perform a position transformation of the 3D model based on a position of a build platform of the 3D printer.

7. The system of claim 6, wherein the position of the build platform is determined from print commands used to drive the 3D printer.

8. The system of claim 1, wherein the monitoring engine is to generate a completion message if the print job finishes successfully.

9. A method of monitoring a three-dimensional (3D) printer during the performance of a print job, comprising:
   receiving an image of an object being printed by the 3D printer;
   generating a baseline image based on a model of the object;
   determining a position of a printer element from print commands used to drive the 3D printer;
   determining, based on the position, that the printer element would partially block a view of the 3D object being printed;
   masking a portion of the baseline image corresponding to the printer element; and
   comparing the image with the baseline image to determine a status of the 3D print job; and
   generating an error if the 3D print job is failing.

10. The method of claim 9, wherein generating the model comprises generating the model from print commands used to drive the 3D printer.

11. The method of claim 10, wherein the print commands are in G-code format.

12. The method of claim 9, wherein generating the baseline image comprises transforming the 3D model to match a perspective of a camera used for capturing the image of the object.

13. The method of claim 12, wherein generating the baseline image comprises performing a rotational transformation of the 3D model based on a position of the camera relative to a build platform of the 3D printer.

14. The method of claim 9, wherein generating the baseline image comprises performing a position transformation of the 3D model based on a position of a build platform of the 3D printer.

15. The method of claim 14, comprising determining the position of the build platform from print commands used to drive the 3D printer.

16. The method of claim 9, comprising generating a completion message if the print job finishes successfully.

17. A non-transitory, tangible, computer-readable medium having instructions stored thereon that, when executed by a processor, direct the processor to:
    receive, during the performance of a print job, an image of an object being printed by a 3D printer;
    generate a baseline image based on a model of the object;
    determine a position of a printer element from print commands used to drive the 3D printer;
    determine, based on the position, that the printer element would partially block a view of the 3D object being printed;
    mask a portion of the baseline image corresponding to the printer element; and
    compare the image with the baseline image to determine a status of the 3D print job; and
    generate an error if the 3D print job has failed.

18. The computer-readable medium of claim 17, wherein the instructions direct the processor generate the model from print commands used to drive the 3D printer.

19. The computer-readable medium of claim 18, wherein the print commands are in G-code format.

20. The computer-readable medium of claim 17, wherein the instructions direct the processor to transform the 3D model to match the perspective of the camera.

21. The computer-readable medium of claim 17, wherein the instructions direct the processor to perform a rotational transformation of the 3D model based on a position of the camera relative to a build platform of the 3D printer.

\* \* \* \* \*